2,647,834

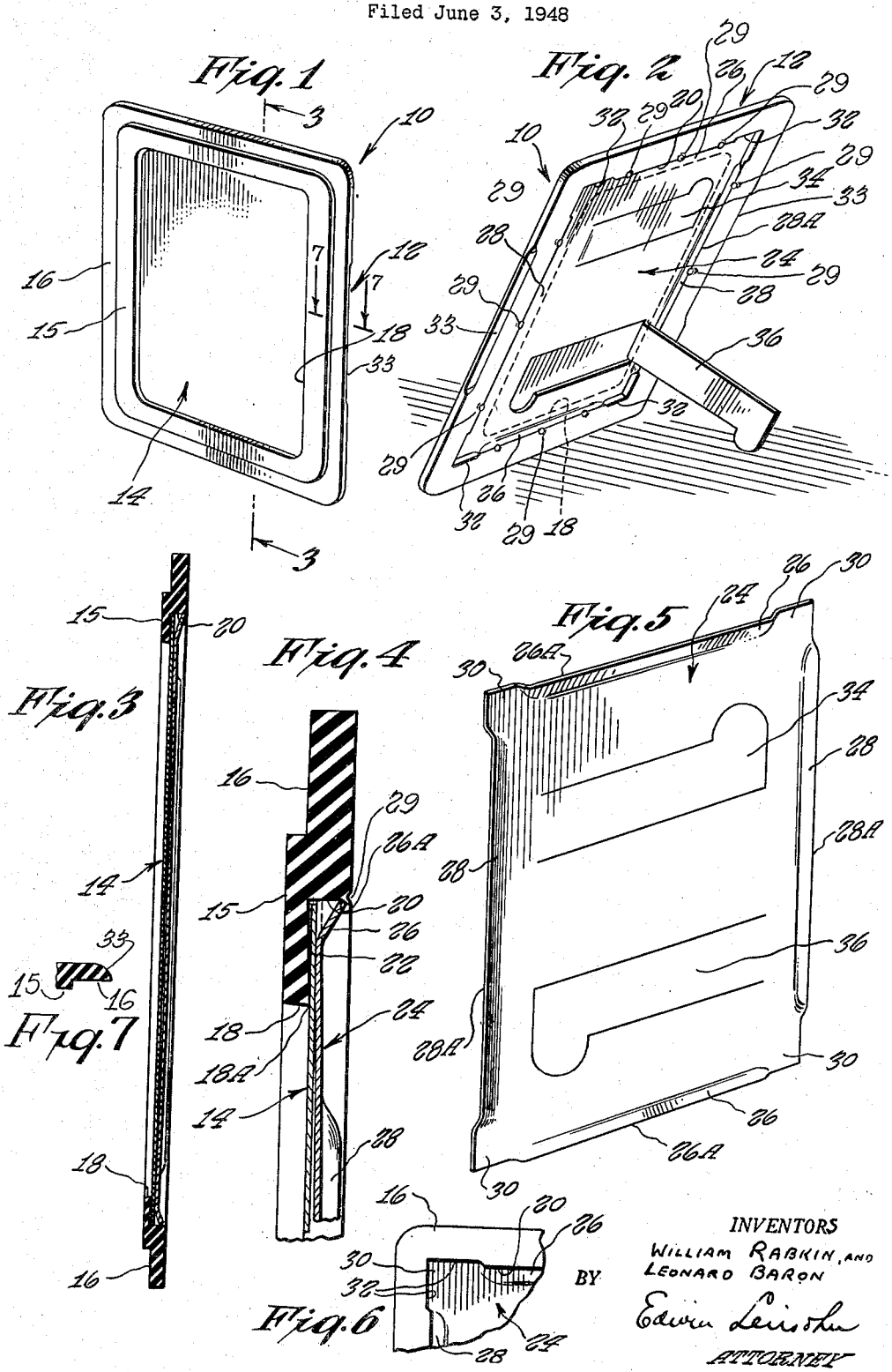
Aug. 4, 1953 — W. RABKIN ET AL — 2,647,834
FRAMED PHOTOGRAPHIC PLATE
Filed June 3, 1948
INVENTORS
WILLIAM RABKIN, AND
LEONARD BARON
BY Edwin Levinson
ATTORNEY Patented Aug. 4, 1953

UNITED STATES PATENT OFFICE 2,647,834

FRAMED PHOTOGRAPHIC PLATE

William Rabkin and Leonard Baron, New York, N. Y., assignors to International Mutoscope Corporation, Long Island City, N. Y., a corporation of New York Application June 3, 1948, Serial No. 30,783

5 Claims. (Cl. 95—8)

This invention relates to framed photographic plates for use in automatic photographing machines.

One of the objects of the present invention is the provision of a framed photographic plate in which the frame for the sensitized plate or sheet is formed of a plastic end and is provided with a backing member which holds the sensitized photographic plate in position and which is itself secured to the plastic frame in such manner as to obviate the use of an adhesive or other extraneous fastening means.

Another object of the invention is to provide a framed photographic plate which may have the frame formed of a plastic and yet be of sufficient weight to insure the proper discharge of the unit by gravity from the photographic machine.

A further object of the invention is the provision of a framed photographic plate which is so constructed as to facilitate the assembly of the photographic plate and the parts of the frame in a dark room.

A further object of the invention is to provide a framed photographic plate with a liquid-tight seal between the photographic plate and the front of the frame for preventing the passage of the liquid chemicals or other liquid, with which the photographic plate is treated in the photographic machine, following the exposure of the plate, between the frame and the marginal edge portion of the plate. In this connection it will be understood that the framed photographic plates of the type to which the present invention relates also constitute shallow trays to receive liquid chemicals, for example, as described in the patent to Rabkin No. 2,192,755. If these chemicals are not confined to the outer surface of the photographic plate within the boundary of the inner edge wall of the front of the frame, so that then they may be thoroughly removed in the rinsing operations, they may impair or even ruin the photograph.

The above and other objects, features and advantages of the present invention will be more fully understood from the following description considered in connection with the accompanying illustrative drawings.

In the drawings:

Fig. 1 is a front perspective of a framed photographic plate embodying the present invention;

Fig. 2 is a rear perspective view of said framed photographic plate, showing the backing provided with a reversible easel support;

Fig. 3 is a sectional view, on a larger scale, on the line 3—3 of Fig. 1;

Fig. 4 is a fragmentary sectional view on a larger scale than that of Fig. 3;

Fig. 5 is a perspective view of the backing member of the frame;

Fig. 6 is a view of a corner portion of the back of the framed plate;

Fig. 7 is a sectional view on the line 7—7 of Fig. 1.

Referring now to the drawings in detail, the framed photographic plate 10 of the present invention comprises a frame 12 in which a sensitized (non-exposed) photographic plate 14 is mounted. The frame 12 is made of any suitable plastic, preferably by molding the same. Said frame has a raised peripheral portion 15 spaced laterally inwardly of the marginal edge portion 16. The inner edge wall 18 of frame part 15 is peripherally continuous and, besides defining the frame opening through which the plate 14 is exposed to view, also constitutes the peripheral wall of a shallow tray for the chemicals or other liquids which are used in developing, and fixing the photograph, in the photographic machine, following the exposure of the plate 14 in taking the picture. The back of the frame part is provided with a recess defined by the inner peripheral wall 20 which is open at the back of the frame for the insertion of the photographic plate or sheet 14. An inner peripherally extending shoulder 22 extends from wall 18 to wall 20 and overlies the outer marginal edge portion of the photographic plate 14. A backing member 24 formed of sheet metal which is thin and flexible is mounted in said recess of frame 16, in the back opening thereof defined by peripheral wall 20. Said backing member 24 holds the photographic plate 14 in position in the frame, as will be readily understood, and covers said photographic plate at the back thereof.

As shown in Fig. 5, backing member 24 is provided with opposed side edge portions 26 and with opposed side edge portions 28 which are bent rearwardly from the plane of said backing member. The corner portions 30 of backing member 24 are in the plane of the latter and the corner portions of wall 20 are recessed as indicated at 32 to facilitate the positioning of backing member 24 in the frame 16, after the photographic plate is positioned in the latter. After the backing member 24 is positioned in frame part 16, the initially raised or rearwardly bent marginal edge portions 26 and 28 are pressed inwardly to force the edges 26A and 28A thereof, respectively, into tight or penetrating engagement with the adjacent portions of peripheral wall 20 for securing said backing member in position and for holding the photographic plate 14 tightly against the inner shoulder 22 of frame member 16 continuously therearound, particularly at the inner peripheral edge 18A of the inner peripheral wall 18 of said frame, whereby to provide a fluid-tight seal between said photographic plate 14 and frame 16 at the front of the frame, so as to prevent seepage of liquid between shoulder 22 and the confronting or underlying marginal edge portion of plate 14. In addition to pressing portions 26 and 28 of backing member 24 into engagement with wall 20, detent portions 29 of the frame are punched in at the back surface of the frame adjacent wall 20 whereby said punched-in portions project over edge portions 26 and 28 (Figs. 2 and 4) for more securely holding back member 24 in position. In order further to improve the liquid tight joint between plate 14 and frame 16, shoulder 22 is slanted toward the front of the frame, as best shown in Fig. 4, so that the front of plate 14 is engaged by a comparatively narrow marginal edge portion of shoulder 22 immediately adjacent edge 18A of inner edge wall 18, as a result of which the pressure of backing member 24 on plate 14 is substantially concentrated on a corresponding narrow peripherally extending part of plate 14 in the region of edge 18A for tightly pressing said plate against the narrow marginal part of shoulder 22 adjacent edge 18A.

It will be understood that frame 16, sensitized photographic plate 14, and backing member 24 are assembled and secured to each other in a dark room and that the photographic plates 10 are packaged in a dark room in a light proof package, so that the framed photographic plates are not exposed to light until the exposure of the plates successively in the photographic machine. In assembling the parts of the framed photographic plate, the plate 14 is inserted in the frame through the opening defined by the peripheral wall 20 after which the backing member is placed in position, followed by the application of pressure to the raised marginal edge portions 26 and 28 for partially bending the latter toward the front of the frame member 16 whereby backing member 24 presses the plate 14 tightly against shoulder 22 especially in the region of peripheral edge 18A, it being understood that the forward bending of edge portions 26 and 28 result in the edges 26A and 28A of said edge portions respectively partially projecting into the softer material constituted by the plastic of which frame member 16 is molded, thus securely fastening the backing member in position in pressure applying relation to frame 14 against shoulder 22. The punched-in portions 29 are formed by suitable punch elements substantially simultaneously with the forward bending of edge portions 26 and 28. It will be understood that before pressure is applied to the marginal edge portions 26 and 28 of the backing member 24, the overall size of said backing member is such that it may be placed in position in the frame member 16 without the use of force, and in this connection it will be understood that the corner recess 32 provided in frame member 16 facilitates the insertion of the backing member.

The provision of the sheet metal backing member 24 not only enables the securement of said backing member to frame member 16 by simple mechanical operations thus obviating the use of an adhesive or other extraneous fastening means, but in addition said metal plate 24 inherently adds to the weight of the framed unit sufficiently to assure the proper passage thereof, by gravity, down the dispensing or discharge chute of the photographic machine.

As shown in Figs. 1, 2 and 7, portions 33 of reduced thickness and with rounded surfaces are provided in the opposite marginal edge 16 at the opposite sides of the frame to increase the space between adjacent superimposed frames in the supply magazine of the photographic machine at the frame portions between which the plate-separating finger of the plate-feeding device moves in the plate feeding operation, as described for example in the application of William Rabkin et al., Ser. No. 689,178, filed August 8, 1946, and assigned to the assignee of the present application. A portion 33 of reduced thickness is provided at both side edges, as shown, instead of at only one side edge, so as to obviate the necessity for orienting the stacked plates in the supply magazine, as will be readily understood.

As illustrated in Fig. 2, the frame photographic plate 10 is provided with means to enable the latter to be mounted in either of two positions, in easel fashion, so that the photograph may be in an upright position. For this purpose backing member 24 is provided with the partially severed bendable parts 34 and 36 which are normally in the plane of the backing member 24 but which may be bent therefrom alternatively as illustrated in Fig. 2, depending upon which of the two opposite edges of a frame 12 it is necessary to support the framed plate 10 with the photograph in upright position. As shown in Fig. 2, part 36 has been bent out of the plate 24 for supporting the unit on the adjacent edge, but if it is necessary to support the unit on its opposite edge, part 34, instead of part 36, is bent out of the plate 24, as will be readily understood.

It will be understood that various changes in the details of construction and in the form and shape of the framed photographic plate may be made without departing from the underlying idea or principles of this invention within the scope of the appended claims.

Having thus described our invention, what we claim and desire to secure by Letters Patent, is:

1. A framed photographic plate for automatic photographic machines, comprising a plastic frame having an inner peripheral edge wall defining an opening and having an additional inner peripheral edge wall defining a recess at the back of the frame around said opening, said additional edge wall being disposed rearwardly and laterally outwardly of said first mentioned peripheral edge wall, said recess having a peripheral shoulder extending laterally from said first mentioned peripheral edge wall to said additional edge wall and inclined from the said first mentioned edge wall laterally towards the front of the frame, and a photo-sensitive plate mounted in said recess and having its outer marginal edge portion pressed tightly against said shoulder continuously therearound at said opening and forming a liquid-tight joint between said plate and the frame at said inner peripheral edge wall of the frame, and a backing member mounted in said recess for holding said plate pressed against said shoulder, said backing member comprising a sheet metal plate having marginal edge portions thereof forced into penetrating engagement into the body of said additional peripheral edge wall for firmly securing said backing member in position.

2. A framed photographic plate for automatic photographic machines, comprising a plastic frame having an inner peripheral edge wall defining an opening and having an additional inner peripheral edge wall defining a recess at the back of the frame around said opening, a photo-sensitive plate mounted in said recess and covering said opening, and a backing member comprising a sheet metal plate mounted in said recess at the back of said plate for holding said plate in position and for weighting said frame, said metal plate having edge portions penetrating said inner edge wall of the plastic frame and said plastic frame having integral punched in detent portions at the back surface thereof and extending along the line of penetration of said edge portions into said wall, said punched-in portions projecting over said edges of said metal plate for securing said metal plate in position in said recess.

3. A framed photographic plate for automatic photographic machines, comprising a plastic frame having an inner peripheral edge wall defining an opening and having an additional inner peripheral edge wall disposed rearwardly and laterally outwardly of said first mentioned peripheral edge wall to define a recess at the back of the frame around said opening, a photo-sensitive plate mounted in said recess and covering said opening, and a backing member comprising a sheet metal plate mounted in said recess at the back of said plate for holding said plate in position and for weighting said frame, said metal plate having edge portions bent rearwardly from the plane of the metal plate and terminating in edges forced into penetrating engagement with said additional peripheral edge wall of the plastic frame to secure the metal plate in position in said recess for holding said photo-sensitive plate in position, both said metal plate and said additional peripheral edge wall being substantially rectangular, said metal plate having corner portions in the plane thereof, and said additional peripheral edge wall having recessed corners to accommodate said corner portions.

4. A framed photographic plate for automatic photographic machines, comprising a frame formed of an organic plastic molding material, said frame having an inner peripheral edge wall defining an opening and having means defining a recess at the back of the frame around said opening, a photo-sensitive plate mounted in said recess and covering said opening, and a sheet metal plate mounted in said recess at the back of said first mentioned plate for holding the latter in position, said metal plate having a greater degree of hardness than the material of said frame, and said metal plate having edge portions penetrating into the comparatively softer material of the frame for securing said metal plate in position in said recess, and said frame having punched-in detent portions at the back surface thereof which project over said edge portions of said metal plate for further securing the latter in position.

5. A framed photographic plate for automatic photographic machines, comprising a frame formed of an organic plastic molding material, said frame having an inner peripheral edge wall defining an opening and having an additional inner peripheral edge wall defining a recess at the back of the frame around said opening, said additional edge wall being disposed rearwardly and laterally outwardly of said first mentioned peripheral edge wall, said recess having a peripheral shoulder extending from said first mentioned peripheral edge wall to said additional edge wall, a photo-sensitive plate mounted in said recess and covering said opening, said plate having its outer marginal edge portion abutting said shoulder, and a sheet metal plate mounted in said recess at the back of said first mentioned plate for holding the latter in position, said metal plate having a greater degree of hardness than the material of said frame, and said metal plate having edge portions bent rearwardly from the plane of the metal plate and penetrating into the comparatively softer material of the frame for securing said metal plate in position in said recess, the bend line portion of said metal plate portions overlying said outer marginal edge portion of said photo-sensitive plate and pressing said latter portion tightly against said shoulder continuously therearound at said opening and forming a liquid-tight joint between said photo-sensitive plate and the frame at said first mentioned inner peripheral edge wall of the frame.

WILLIAM RABKIN.
LEONARD BARON.

References Cited in the file of this patent

UNITED STATES PATENTS

| Number | Name | Date |
| --- | --- | --- |
| 1,086,555 | Pifer | Feb. 10, 1914 |
| 1,665,605 | Olsen | Apr. 10, 1928 |
| 1,692,999 | Siegel | Nov. 27, 1928 |
| 2,014,437 | Laing | Sept. 17, 1935 |
| 2,149,636 | Slaughter | Mar. 7, 1939 |
| 2,296,596 | Brown | Sept. 22, 1942 |

FOREIGN PATENTS

| Number | Country | Date |
| --- | --- | --- |
| 150,369 | Austria | Aug. 10, 1937 |